(12) United States Patent
Kim et al.

(10) Patent No.: US 7,847,914 B2
(45) Date of Patent: Dec. 7, 2010

(54) THIN FILM TRANSISTOR ARRAY PANEL AND METHOD FOR REPAIRING LIQUID CRYSTAL DISPLAY INCLUDING THE SAME

(75) Inventors: Kyung-Wook Kim, Seoul (KR); Dong-Gyu Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 12/615,220

(22) Filed: Nov. 9, 2009

(65) Prior Publication Data

US 2010/0075562 A1    Mar. 25, 2010

Related U.S. Application Data

(62) Division of application No. 10/876,416, filed on Jun. 25, 2004, now abandoned.

(30) Foreign Application Priority Data

Jun. 26, 2003    (KR) ............................... 2003-41989

(51) Int. Cl.
  *G02F 1/1343*    (2006.01)
  *G02F 1/1333*    (2006.01)
(52) U.S. Cl. ...................... 349/192; 349/39; 349/54; 349/55
(58) Field of Classification Search .................. 349/39, 349/54, 55, 192
  See application file for complete search history.

(56) References Cited

U.S. PATENT DOCUMENTS 6,118,505 A * 9/2000 Nagata et al. ............... 349/106

| | | | |
|---|---|---|---|
| 6,597,413 B2 * | 7/2003 | Kurashina | 349/39 |
| 6,839,099 B2 * | 1/2005 | Fukunishi | 349/54 |
| 6,839,118 B2 * | 1/2005 | Nagaoka | 349/143 |
| 2003/0043318 A1 * | 3/2003 | Kim | 349/106 |

FOREIGN PATENT DOCUMENTS

| | | |
|---|---|---|
| JP | 07-104313 | 4/1995 |
| JP | 10-096949 | 4/1998 |
| JP | 2000-305106 | 11/2000 |
| JP | 2002-236286 | 8/2002 |
| JP | 2002-303881 | 10/2002 |
| KR | 1020000009914 A | 2/2000 |
| KR | 1020020087738 A | 11/2002 |

* cited by examiner

*Primary Examiner*—Michael H Caley
(74) *Attorney, Agent, or Firm*—Innovation Counsel LLP

(57) ABSTRACT

A thin film transistor (TFT) array panel, a liquid crystal display (LCD), and a method of repairing a TFT array panel with a defective pixel is disclosed. When a white defect occurs such that a pixel is always in a white state, a corresponding pixel electrode is supplied with the predetermined voltage applied to a corresponding storage electrode line so that the pixel becomes permanently dark, which may not be easily detected. The connection between the pixel electrode and the storage electrode line is provided by illuminating a laser beam from a common electrode panel through a contact hole in the TFT array panel to electrically couple the storage electrode and the pixel electrode. Advantageously, a backlight unit or chassis does not need to be separated or disassembled from the LCD when repairing the defect. Furthermore, the color filter stripes and the light blocking member are not damaged, thereby improving the reliability of the repair.

7 Claims, 5 Drawing Sheets

THIN FILM TRANSISTOR ARRAY PANEL AND METHOD FOR REPAIRING LIQUID CRYSTAL DISPLAY INCLUDING THE SAME

CROSS-REFERENCE TO RELATED APPLICATION

This application is a divisional of U.S. patent application Ser. No. 10/876,416, filed Jun. 25, 2004, which claims priority to Patent Application No. 2003-41989, filed on Jun. 26, 2003, in the Korean Intellectual Property Office, Republic of Korea, the entire contents of which are hereby incorporated by reference

BACKGROUND (a) Field of the Invention

The present invention relates to liquid crystal displays (LCDs) and more particularly to a thin film transistor array panel and a method of repairing an LCD including the same.

(b) Description of Related Art

LCDs are one of the most widely used flat panel displays. An LCD includes two panels having field-generating electrodes with a gap interposed therebetween. A liquid crystal (LC) layer fills the gap between the panels. The LCD displays images by applying voltages to the field-generating electrodes to generate an electric field in the LC layer, which determines orientations of LC molecules in the LC layer to adjust polarization of incident light.

The LCD includes a plurality of pixels arranged in a matrix and a plurality of signal lines for driving the pixels, such as gate lines for transmitting scanning signals and data lines for transmitting data signals. Each pixel includes a pixel electrode, a thin film transistor (TFT) connected to the gate lines and the data lines for controlling the data signals, and a storage electrode forming a storage capacitor along with the pixel electrode for maintaining the data signals for a predetermined time.

The defects in an LCD, which increase the manufacturing cost of the LCD, include pixel defects. Pixel defects include a white defect, in which a pixel is in a permanent white state, and a black defect, in which a pixel is in a permanent black state.

The white defect is caused by poor contact between the pixel electrode and the TFT or by a malfunction of the TFT, which initially makes a corresponding pixel to be in a black state and then makes the pixel to be in a white state in a normally white mode LCD since current leakage makes the voltage of the pixel electrode on one panel equal to a common voltage of a common electrode on the other panel. Another cause of the white defect is a short circuit between a pixel electrode and a data line or a common electrode caused by conductive particles. Since the white defect is easily noticed by human eyes while the black defect is not, it is preferable that the white defect be changed into the black defect. For example, the white defect can be repaired or changed by connecting the corresponding pixel electrode to a gate line or a storage electrode.

The connection between the pixel electrode and the gate line or the storage electrode can be obtained by laser illumination from a TFT array panel or from a common electrode panel. The laser illumination from the TFT array panel that is adjacent to a backlight unit requires the disassembling of the LCD for separating the backlight unit or a chassis. The illumination from the common electrode panel easily damages color filters and black matrix on the common electrode panel, thereby causing the strip of the common electrode or the short circuit between the common electrode and a pixel electrode, thereby decreasing the reliability of the repair. When the color filters are disposed on the TFT array panel, the thick color filters obstruct the electrical connection between the pixel electrode and the gate line or the storage electrode and the color filters tend to come off from the bottom.

SUMMARY

A thin film transistor (TFT) array panel, a liquid crystal display (LCD), and a method of repairing a TFT array panel with a defective pixel is disclosed. When a white defect occurs such that a pixel is always in a white state, a corresponding pixel electrode is supplied with the predetermined voltage applied to a corresponding storage electrode line so that the pixel becomes permanently dark, which may not be easily detected. The connection between the pixel electrode and the storage electrode line is provided by illuminating a laser beam from a common electrode panel through a contact hole in the TFT array panel to electrically couple the storage electrode and the pixel electrode.

In accordance with one embodiment of the present invention, a thin film transistor array panel is provided, comprising: a first insulating substrate; a storage electrode over the first insulating substrate; an insulating layer over the storage electrode; a drain electrode of a transistor over the insulating layer; a color filter stripe over the drain electrode; and a pixel electrode over the color filter stripe, the pixel electrode being operably coupled to the drain electrode via an aperture through the color filter stripe, wherein the aperture is directly over the storage electrode.

In accordance with another embodiment of the present invention, a liquid crystal display (LCD) is provided, comprising: a thin film transistor array panel as disclosed above; a second panel including a second insulating substrate, a light blocking member not overlapping the aperture, and a common electrode over the light blocking member and the second insulating substrate; and a liquid crystal layer between the first panel and the second panel.

In accordance with yet another embodiment of the present invention, a method for repairing a liquid crystal display (LCD) having a thin film transistor (TFT) array panel with a defective pixel is provided. The TFT array panel includes a storage electrode, an insulating layer over the storage electrode, a drain electrode of a transistor over the insulating layer, a color filter stripe over the drain electrode, and a pixel electrode over the color filter stripe, the pixel electrode being operably coupled to the drain electrode via an aperture through the color filter stripe. The method for repairing comprises providing a laser beam through the aperture until the pixel electrode is electrically coupled to the storage electrode; and electrically isolating the drain electrode from the transistor.

Advantageously, the present invention provides an apparatus and method in which a backlight unit or chassis does not need to be separated or disassembled from the LCD when repairing the defect. Furthermore, the color filter stripes and the light blocking member are not damaged, thereby improving the reliability of the repair.

BRIEF DESCRIPTION OF THE DRAWINGS

The present invention will become more apparent by describing embodiments thereof in detail with reference to the accompanying drawings in which.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
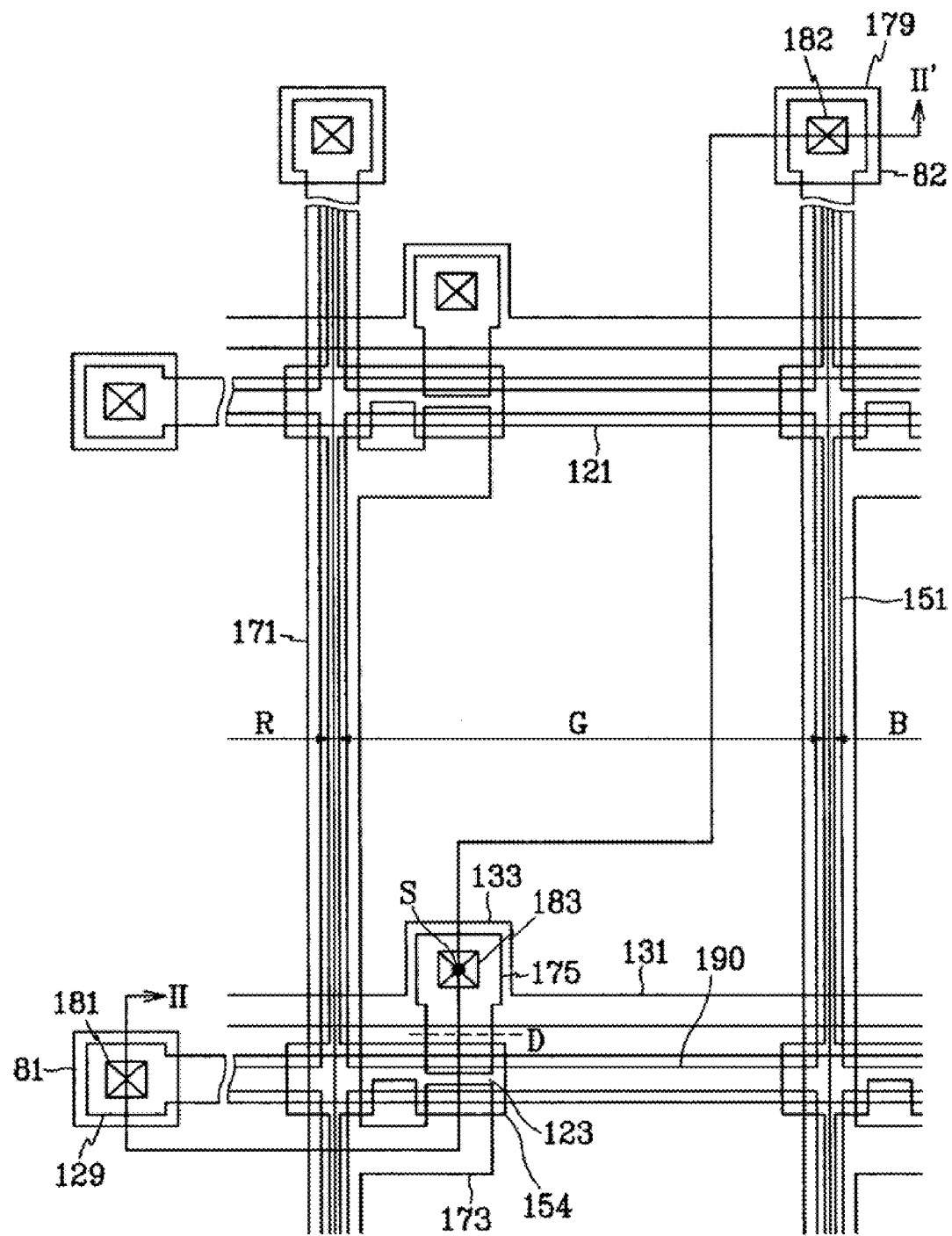
FIG. 1 is a layout view of a TFT array panel for an LCD according to an embodiment of the present invention.

The present invention will now be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Liquid crystal displays (LCDs) according to embodiments of the present invention will be described with reference to the accompanying drawings.

Figure 2:
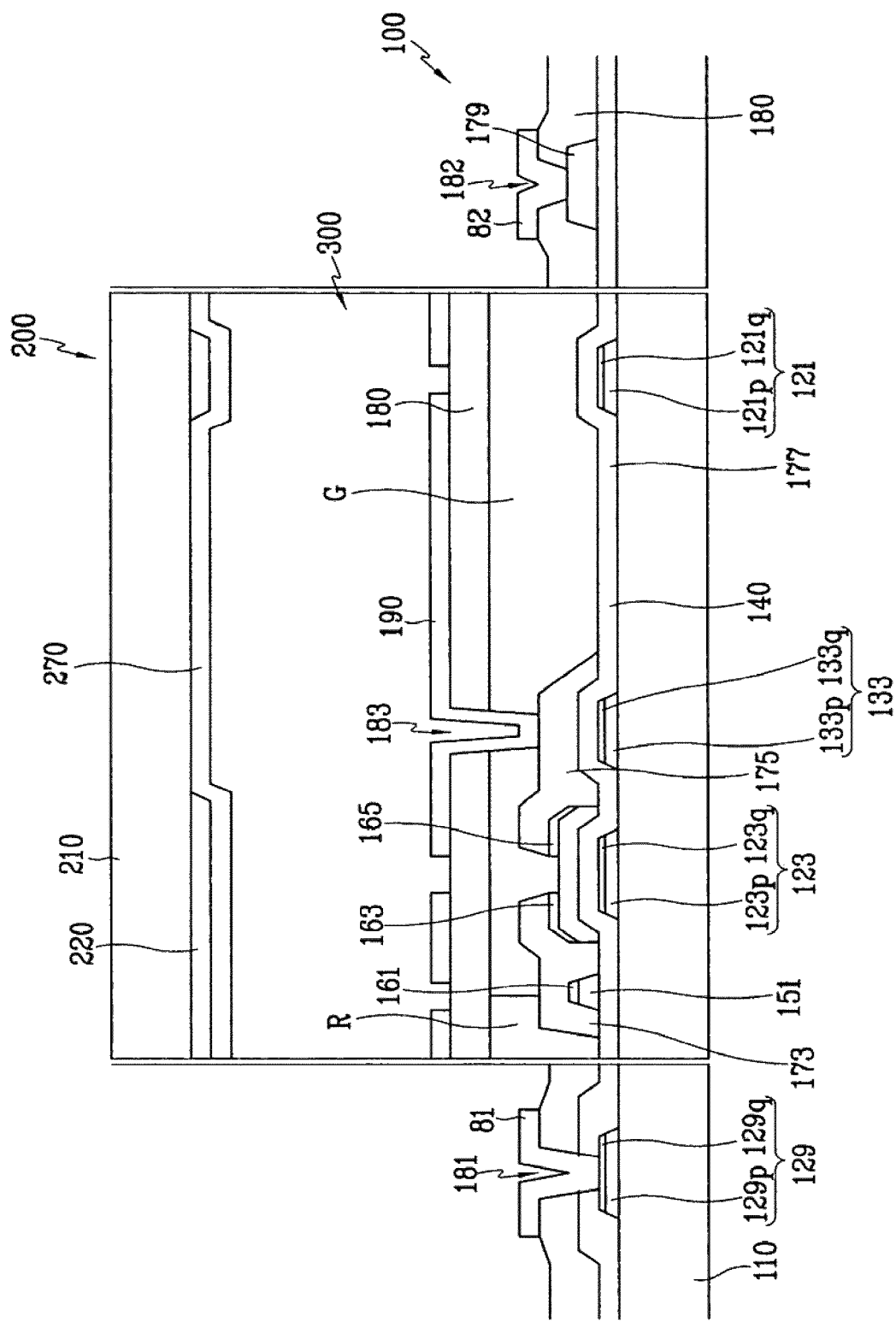
FIG. 2 is a sectional view of an LCD including the TFT array panel shown in FIG. 1 taken along the line II-II'.

An LCD according to an embodiment of the present invention is described in detail with reference to FIGS. 1 and 2. FIG. 1 is a layout view of a TFT array panel for an LCD according to an embodiment of the present invention, and FIG. 2 is a sectional view of an LCD including the TFT array panel shown in FIG. 1 taken along the line II-II'.

An LCD according to an embodiment of the present invention includes a TFT array panel 100, a common electrode panel 200 facing the TFT array panel 100 with a predetermined gap, and a liquid crystal (LC) layer 300 in the gap between the TFT array panel 100 and the common electrode panel 200.

The common electrode panel 200 includes a substrate 210, a light blocking member 220 formed on the substrate 210, and a common electrode 270 formed on an entire surface of the substrate 210.

The TFT array panel 100 will now be described in more detail.

A plurality of gate lines 121 for transmitting gate signals and a plurality of storage electrode lines 131 are formed on an insulating substrate 110.

Each gate line 121 extends substantially in a transverse direction and a plurality of portions of each gate line 121 form a plurality of gate electrodes 123. Each gate line 121 includes a plurality of expansions protruding downward and an end portion 129 having a large area for contact with another layer or an external device.

Each storage electrode line 131 extends substantially in a transverse direction and includes a plurality of projections forming storage electrodes 133.

The gate lines 121 include two films having different physical characteristics, a lower film 121p and an upper film 121q. The lower film 121p is preferably made of low resistivity metal including Al-containing metal such as Al and/or Al alloy, for reducing signal delay or voltage drop in the gate lines 121. On the other hand, the upper film 121q is preferably made of material such as Cr, Mo, and/or Mo alloy having good contact characteristics with other materials such as indium tin oxide (ITO) or indium zinc oxide (IZO). A good exemplary combination of the lower film material and the upper film material is Cr and Al—Nd alloy. In FIG. 2, the lower and the upper films of the gate electrodes 123 are indicated by reference numerals 123p and 123q, respectively, and the lower and the upper films of the end portions 129 are indicated by reference numerals 129p and 129q, respectively.

The lateral sides of the upper film and the lower film are inclined relative to a surface of the substrate 110, and the inclination angle thereof ranges between about 30 degrees and about 80 degrees.

A gate insulating layer 140 preferably made of silicon nitride (SiNx) is formed on the gate lines 121.

A plurality of semiconductor stripes 151 preferably made of hydrogenated amorphous silicon (abbreviated "a-Si") are formed on the gate insulating layer 140. Each semiconductor stripe 151 extends substantially in a longitudinal direction and has a plurality of projections 154 branched out toward the gate electrodes 123. The width of each semiconductor stripe 151 becomes large near the gate lines 121 such that the semiconductor stripe 151 covers large areas of the gate lines 121.

A plurality of ohmic contact stripes and islands 161 and 165 preferably made of silicide or n+ hydrogenated a-Si heavily doped with n-type impurity are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are tapered, and the inclination angles thereof are preferably in a range between about 30 degrees and about 80 degrees.

A plurality of data lines 171 and a plurality of drain electrodes 175 are formed on the ohmic contacts 161 and 165 and the gate insulating layer 140.

The data lines 171 for transmitting data voltages extend substantially in the longitudinal direction and intersect the gate lines 121. A plurality of branches of each data line 171, which project toward the drain electrodes 175, form a plurality of source electrodes 173, and each data line 171 has an end portion 179 having a large area for contact with another layer or an external device. Each drain electrode 175 overlaps a storage electrode 133 and is separated from the data lines 171 and disposed opposite a source electrode 173 with respect to a gate electrode 123. A gate electrode 123, a source electrode 173, and a drain electrode 175 along with a projection 154 of a semiconductor stripe 151 form a TFT having a channel formed in the projection 154 disposed between the source electrode 173 and the drain electrode 175.

The data lines 171 and the drain electrodes 175 are preferably made of material such as Cr, Mo, and/or Mo alloy. However, they may further include an Al film.

Like the gate lines 121, the data lines 171 and the drain electrodes 175 have tapered lateral sides, and the inclination angles thereof range between about 30 degrees and about 80 degrees.

The ohmic contacts 161 and 165 are interposed between the underlying semiconductor stripes 151 and the overlying data lines 171 and the overlying drain electrodes 175, respectively, and reduce the contact resistance therebetween. The semiconductor stripes 151 include a plurality of exposed portions which are not covered with the data lines 171 and the drain electrodes 175, such as portions located between the source electrodes 173 and the drain electrodes 175. Although the semiconductor stripes 151 are narrower than the data lines 171 at most places, the width of the semiconductor stripes 151 becomes large near the gate lines as described above, to smooth the profile of the surface, thereby preventing the disconnection of the data lines 171.

A plurality of red, green, and blue color filter stripes R, G, and B are formed on the data lines 171, the drain electrodes 175, and the exposed portions of the semiconductor stripes 151. Each of the color filter stripes R, G, and B are disposed substantially between two adjacent data lines 171 and extends in a longitudinal direction. The color filter stripes R, G, and B may be divided into a plurality of color filters disposed in respective pixel areas defined by the gate lines 121 and the data lines 171. The color filter stripes R, G, and B are not disposed on a peripheral area which is provided with the end portions 129 and 179 of the gate lines 121 and the data lines 171, respectively. Although edges of adjacent color filter stripes R, G, and B exactly match with each other in one embodiment, the edges may overlap to block the light leakage between the pixel areas.

An additional insulating layer (not shown) may be placed under the color filter stripes R, G, and B.

A passivation layer 180 is formed on the adjacent color filter stripes R, G, and B. The passivation layer 180 is preferably made of photosensitive organic material having a good flatness characteristic, low dielectric insulating material such as a-Si:C:O and/or a-Si:O:F formed by plasma enhanced chemical vapor deposition (PECVD) in one example, or inorganic insulator such as silicon nitride, in another example.

The passivation layer 180 has a plurality of contact holes 182 and 183 exposing the end portions 179 of the data lines 171 and the drain electrodes 175, respectively. In addition, the passivation layer 180 and the gate insulating layer 140 have a plurality of contact holes 181 exposing the end portions 129 of the gate lines 121. The color filter stripes R, G, and B have a plurality of openings on the drain electrodes 175, which make a smooth profile with the contact holes 183. However, the contact holes 183 expose a top surface of the color filter stripes R, G, and B to have stepped profiles.

A plurality of pixel electrodes 190 and a plurality of contact assistants 81 and 82, which are preferably made of transparent conductive material such as ITO and IZO or reflective conductive material such as Al and Ag, are formed on the passivation layer 180.

The pixel electrodes 190 are physically and electrically connected to the drain electrodes 175 through the contact holes 183 such that the pixel electrodes 190 receive the data voltages from the drain electrodes 175. The pixel electrodes 190 supplied with the data voltages generate electric fields in cooperation with a common electrode 270 on the common electrode panel 200, which reorient LC molecules in the LC layer 300 disposed between the pixel electrode 190 and the common electrode 270.

The pixel electrode 190 and the common electrode 270 form a LC capacitor $C_{LC}$, which stores applied voltages after turn-off of the TFT Q. An additional capacitor called a "storage capacitor," which is connected in parallel to the LC capacitor $C_{LC}$, is provided for enhancing the voltage storing capacity. The storage capacitors are implemented by overlapping the pixel electrodes 190 with the storage electrode lines 131. The capacitances of the storage capacitors, i.e., the storage capacitances, are increased by overlapping the drain electrodes 175 with the storage electrodes 133.

Optionally, the pixel electrodes 190 overlap the gate lines 121 and the data lines 171 to increase aperture ratio.

The contact assistants 81 and 82 are connected to the exposed areas of end portions 129 of the gate lines 121 and the exposed areas of end portions 179 of the data lines 171 through the contact holes 181 and 182, respectively. The contact assistants 81 and 82 are not requisites but preferred to protect the exposed end portions 129 and 179 and to complement the adhesiveness of the exposed end portions 129 and 179 to external devices.

The profiles of the pixel electrodes 190 and the contact assistants 81 and 82 are smooth since the sidewalls of the contact holes 181, 182 and 183 are sloped.

In the above-described LCD, the storage electrode lines 131 are supplied with a predetermined voltage. The predetermined voltage is equal to or higher than a maximum voltage difference between the pixel electrodes 190 and the common electrode 270 when the LCD is in a normally white mode, i.e., a pixel in the LCD is the brightest in absence of electric field in the LC layer 300. An example of such a voltage is a gate-on voltage that can turn on the TFTs. Furthermore, the predetermined voltage is equal to or lower than a minimum threshold voltage for driving the pixels when the LCD is in a normally black mode, i.e., a pixel in the LCD is the darkest in absence of electric field in the LC layer 300.

In accordance with the present invention, when a white defect occurs such that a pixel is always in a white state, the pixel electrode 190 for the corresponding pixel is supplied with the predetermined voltage applied to the storage electrode lines 131. Then, the pixel becomes permanently dark, which may not be easily detected.

The connection between the pixel electrode 190 and the storage electrode line 131 is obtained by illuminating a laser beam from the common electrode panel 200 and thus the LCD need not be disassembled for the repair. Advantageously, a backlight unit or chassis need not be separated from the LCD when repairing the defect.

The laser beam is illuminated and directed at a position in the contact hole 183 (denoted by the letter "S") to connect the storage electrode 133 and the drain electrode 175. Then the drain electrode 175 is cut and separated from the TFT by illuminating a laser beam along a line D.

Since the laser beam illumination is performed at the contact holes 183, the color filter stripes R, G, and B and the light blocking member are not damaged, thereby improving the reliability of the repair or change. In addition, since only a gate insulating layer 140 is interposed between the storage electrode 133 and the drain electrode 175, the repair is relatively simple and the color filter stripes R, G, and B are not damaged.

A TFT array panel for an LCD according to another embodiment of the present invention will now be described in detail with reference to FIGS. 3-5.

Figure 3:
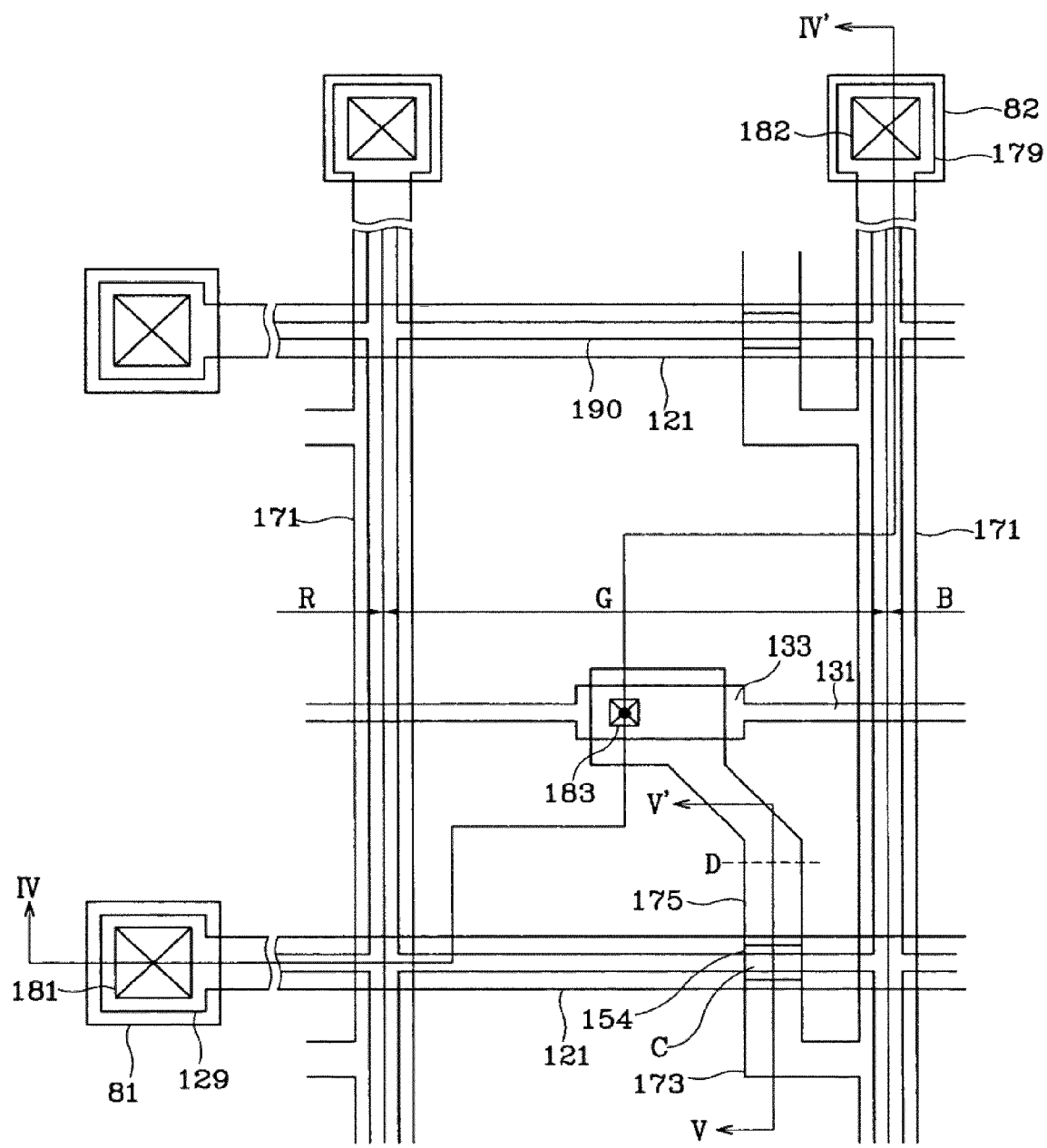
FIG. 3 is a layout view of a TFT array panel for an LCD according to another embodiment of the present invention.
Figure 4:
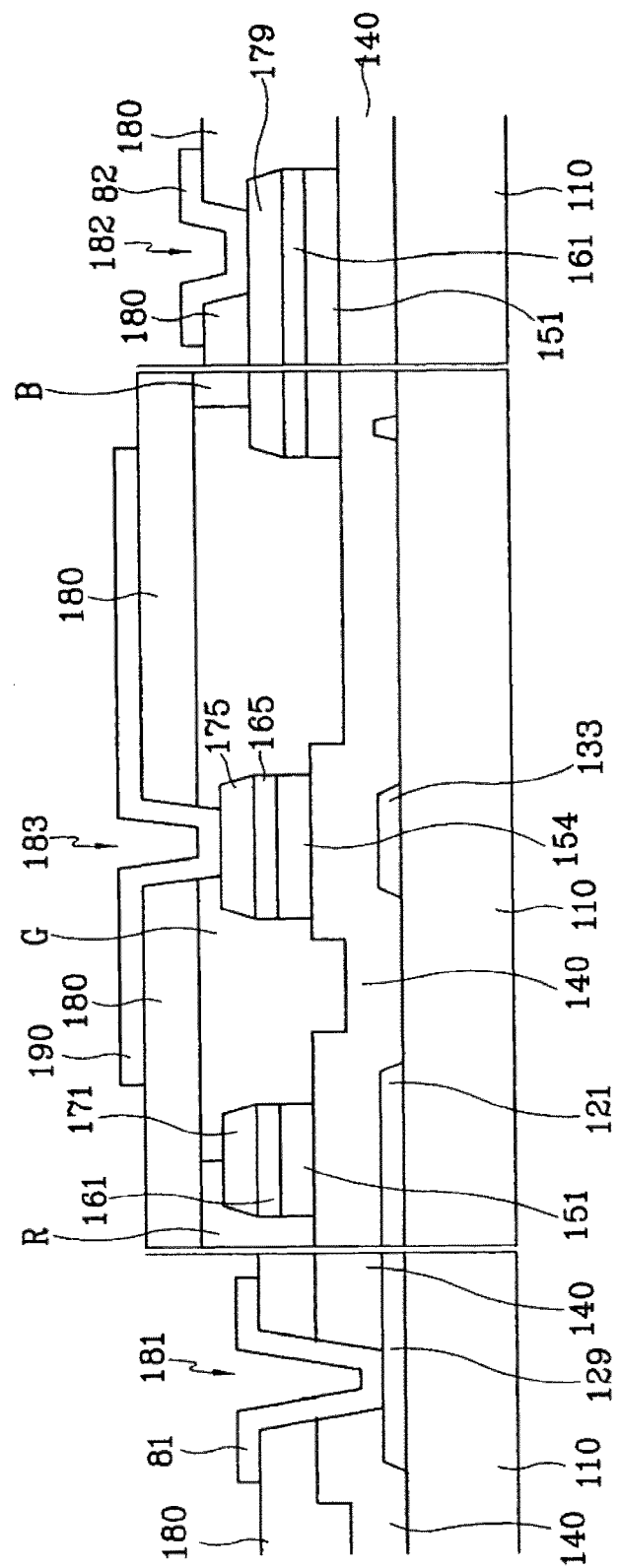
FIG. 4 is a sectional view of the TFT array panel shown in FIG. 3 taken along the line IV-IV'.
Figure 5:
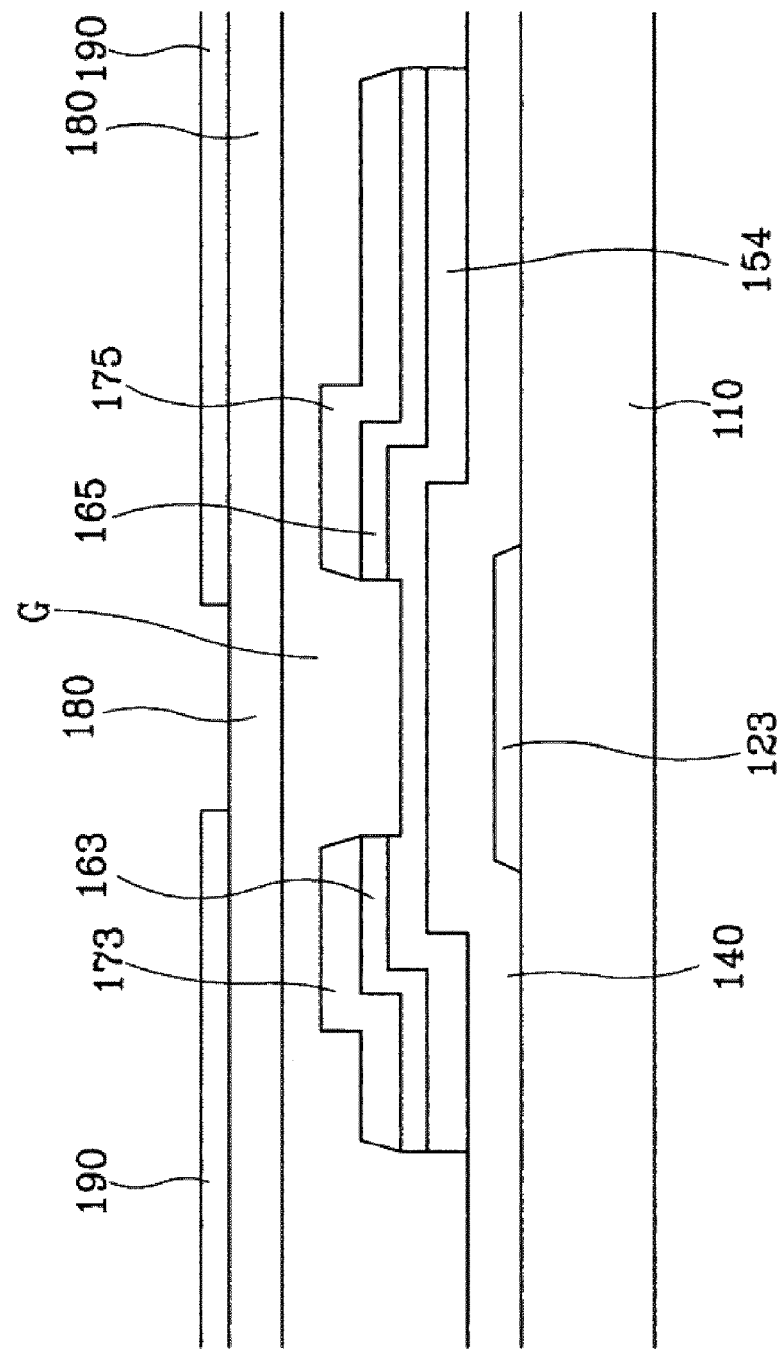
FIG. 5 is a sectional view of the TFT array panel shown in FIG. 3 taken along the line V-V'.

FIG. 3 is a layout view of a TFT array panel for an LCD according to another embodiment of the present invention, FIG. 4 is a sectional view of the TFT array panel shown in FIG. 3 taken along the line IV-IV', and FIG. 5 is a sectional view of the TFT array panel shown in FIG. 3 taken along the line V-V'.

Referring to FIGS. 3-5, a layered structure of the TFT array panel according to this embodiment is almost the same as those shown in FIGS. 1 and 2. That is, a plurality of gate lines 121 including a plurality of gate electrodes 123 and a plurality of storage electrode lines 131 including a plurality of storage electrodes 133 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 including expansions are formed on the ohmic contacts 161 and 165, and a plurality of color filter stripes R, G, and B and a passivation layer 180 are formed thereon. A plurality of contact holes 181, 182, and 183 are provided at the passivation layer 180 and the gate insulating layer 140, and a plurality of pixel electrodes 190 and a plurality of contact assistants 81 and 82 are formed on the passivation layer 180.

Different from the LCD shown in FIGS. 1 and 2, the semiconductor stripes 151 have almost the same planar shapes as the data lines 171 and the drain electrodes 175 as well as the underlying ohmic contacts 161 and 165. However, the projections 154 of the semiconductor stripes 151 include some exposed portions which are not covered with the data lines 171 and the drain electrodes 175, such as portions located between the source electrodes 173 and the drain electrodes 175 as denoted by the letter "C" in FIG. 3, signifying the TFT channel region.

As describe above, the repair or change of a white defect is performed by connecting the drain electrodes 175 and the storage electrodes 133 by illuminating and directing a laser beam from a common electrode panel to a position in the contact hole 183 to thereby connect the storage electrode 133 and the drain electrode 175. Then the drain electrode 175 is cut and separated from the TFT by illuminating a laser beam along a line D, thereby facilitating the repair of a pixel.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for repairing a liquid crystal display (LCD) having a thin film transistor (TFT) array panel with a defective pixel, the TFT array panel including a storage electrode, an insulating layer over the storage electrode, a drain electrode of a transistor over the insulating layer, a color filter stripe over the drain electrode, and a pixel electrode over the color filter stripe, the pixel electrode being operably coupled to the drain electrode via an aperture through the color filter stripe, the method for repairing comprising:
   providing a laser beam through the aperture until the pixel electrode is electrically coupled to the storage electrode; and electrically isolating the drain electrode from the transistor.

2. The method of claim 1 wherein the laser beam is provided from a common electrode panel opposite the TFT array panel.

3. The method of claim 1, wherein the laser beam is directed through the pixel electrode, through the aperture, through the drain electrode, through the insulating layer, and to the storage electrode.

4. The method of claim 1, wherein the drain electrode is separated from the transistor by the laser beam.

5. The method of claim 1, wherein the pixel electrode is separated from the color filter stripe by a passivation layer having an aperture aligned with the aperture through the color filter stripe.

6. The method of claim 1, further comprising providing an ohmic contact between the drain electrode and the storage electrode.

7. The method of claim 1, further comprising providing a semiconductor stripe between the drain electrode and the storage electrode.

* * * * *